Nov. 15, 1932.                F. M. MASKER                1,887,694
                                 VALVE
                         Filed April 7, 1931        2 Sheets-Sheet 1
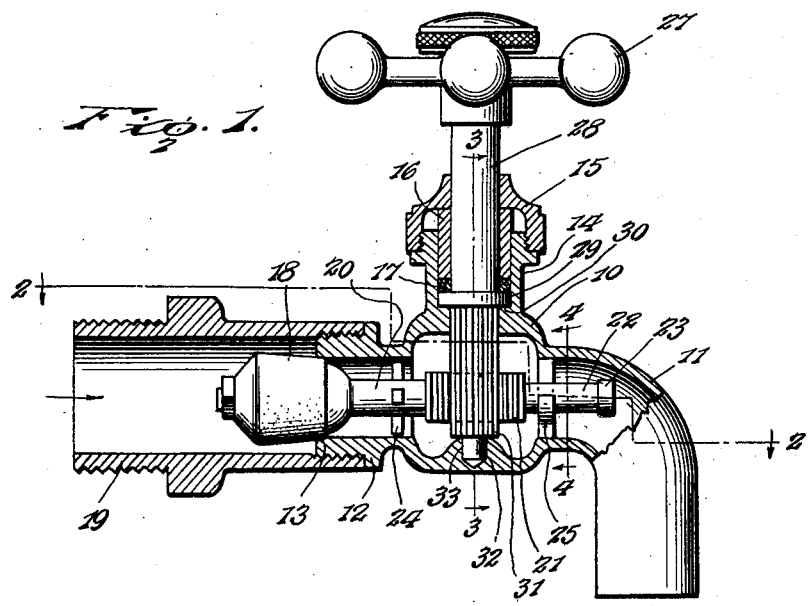
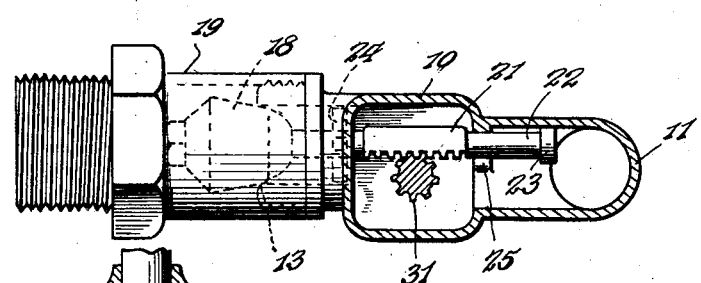
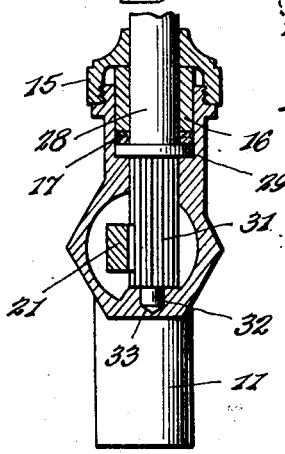
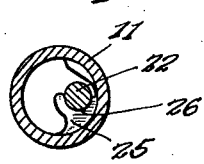
Inventor
F. M. Masker.
By Lacey & Lacey,
Attorneys Nov. 15, 1932.   F. M. MASKER   1,887,694
VALVE
Filed April 7, 1931   2 Sheets-Sheet 2
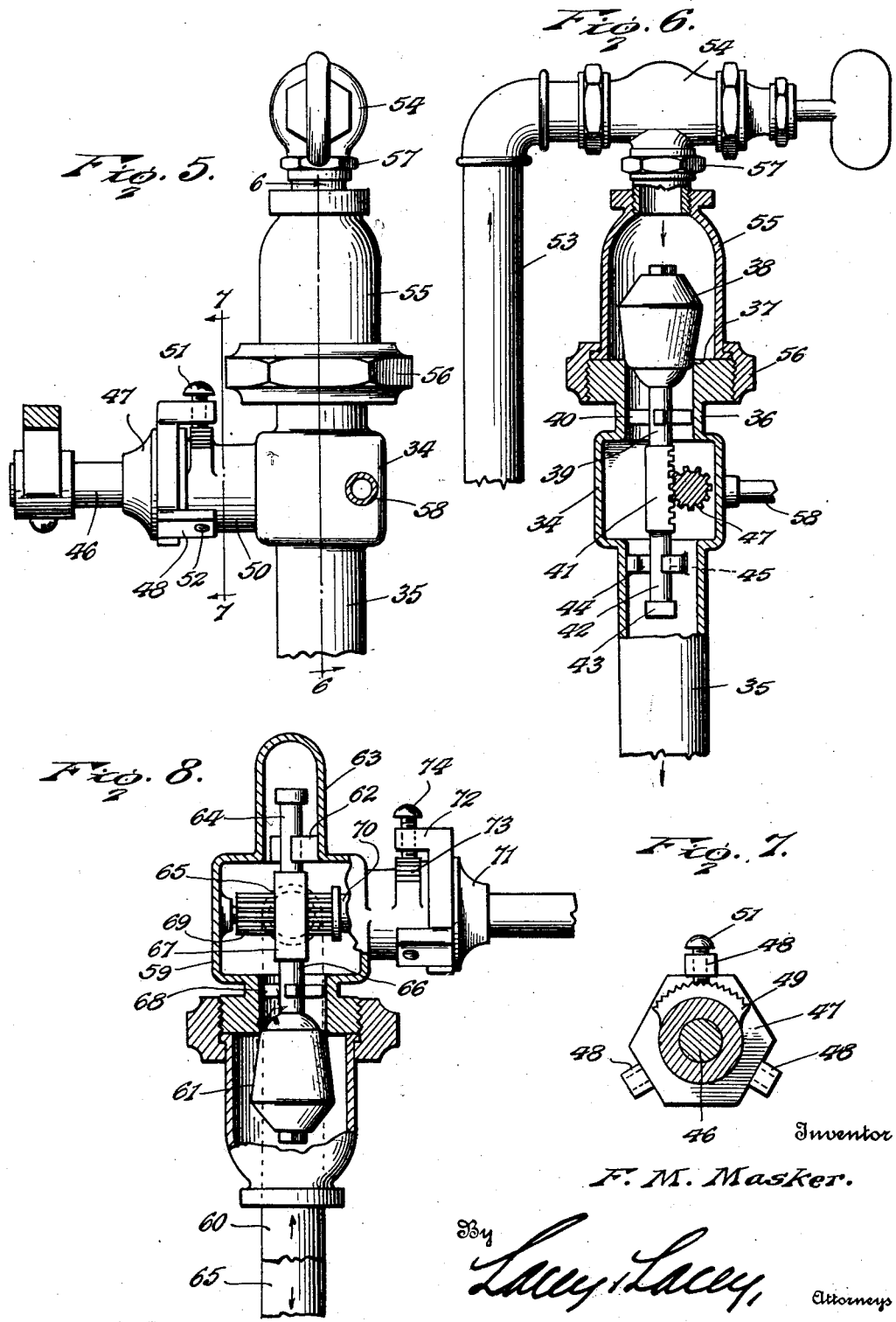
Inventor
F. M. Masker.
By Lacey & Lacey,
Attorneys Patented Nov. 15, 1932

1,887,694

UNITED STATES PATENT OFFICE

FREDERICK M. MASKER, OF PLAINFIELD, NEW JERSEY

VALVE

Application filed April 7, 1931. Serial No. 528,418.

This invention relates to valves and has for an object to provide an easy opening and closing valve which will embody novel means for accurately mounting the valve stem to move without play and wear so that the easy opening and closing characteristics are preserved indefinitely.

A still further object is to provide a valve having the stem mounted in the valve housing by means of spaced guides arranged on opposite sides of the operating mechanism of the valve and so constructed as to permit easy removal and replacement of the valve without the use of tools.

A still further object is to provide a valve in which novel means are employed for effecting an adjustment of the gland nut to take up wear on the packing.

A still further object is to provide a valve in which the valve head is exposed beyond the valve seat formed in the flange coupling member of the valve casing so that by simply unscrewing the coupling the valve head will be exposed for inspection and repairs.

A still further object is to provide a valve in which the handle is operatively connected to the valve stem by means of a rack and pinion, the handle being accurately journaled for rotation in the valve casing so that play, with consequent wear of the rack and pinion, is eliminated.

A still further object is to provide a valve which will be formed of a few simple, strong and inexpensive parts, which will be easy to manufacture, and which will not easily get out of order.

With the above and other objects in view the invention consists in certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a longitudinal sectional view through a spigot equipped with a valve constructed in accordance with the invention, Fig. 2 is a longitudinal sectional view taken on the line 2—2 of Fig. 1, Fig. 3 is a vertical sectional view taken on the line 3—3 of Fig. 1, Fig. 4 is a cross sectional view taken on the line 4—4 of Fig. 1, Fig. 5 is a side elevation of the invention incorporated in a flush tank valve, and showing the means for adjusting the gland nut to take up wear on the packing, Fig. 6 is a vertical sectional view taken on the line 6—6 of Fig. 5, Fig. 7 is a cross sectional view taken on the line 7—7 of Fig. 5, and Fig. 8 is a vertical sectional view of a modified form of flush valve embodying my improvements, the flow being from the bottom instead of from the top, as in Fig. 5.

Referring now specially to Fig. 1 wherein a spigot is shown, 10 designates the valve housing, the same having a downwardly curved outlet pipe 11 on one side and a threaded inlet coupling pipe 12 on the opposite side, the inlet pipe being provided in the edge with a tapered valve seat 13. The valve casing is provided with packing means comprising a base 14 and a gland nut 15 which screws onto the base and bears against an annular follower 16 which compresses a packing washer 17 ahead of it in the usual manner.

In carrying out the invention, I provide a valve 18 which may be of any preferred type and preferably is tapered longitudinally to fit snugly at the inner end against the valve seat 13 and close in the direction of flow through the supply pipe 19. Preferably, the valve is faced with rubber or other similar material, and it will be observed that the valve is disposed exteriorly of the flanged coupling pipe 12 so that by simply unscrewing the spigot the valve will be exposed for inspection and repairs.

The valve is provided with an axial stem 20. The stem is formed substantially midway between the ends with a rack 21, and the free end of the stem is preferably uniformly reduced to provide a cylindrical extension 22 which, as hereinafter will be fully explained, constitutes a guide, and the guide terminates in an enlarged head 23.

The valve stem 20 on one side of the rack is provided with a spider 24 which slidably fits in the bore of the inlet coupling 12. On the opposite side of the rack there is disposed in the bore of the discharge pipe 11 a notched guide lug 25, best shown in Fig. 4, which is provided with a concave upper surface 26 to receive the reduced cylindrical guide extension 22 of the valve stem.

It will be observed that during opening movement of the valve the head 23 performs the function of a stop to engage the guide lug 25 and limit movement of the valve in this direction. Of course, seating of the valve limits movement in the opposite direction.

It will be pointed out that to dismount the valve and stem as a unit from the valve housing, it is simply necessary to withdraw the valve until the spider 24 clears the valve seat, whereupon the guide extension 22 may be rocked up and out of the concave surface 26 in the guide lug 25 so that it clears the guide lug, whereupon the assembly may be withdrawn rearwardly from the valve casing.

The handle 27 may be of any preferred type and is provided with a shaft 28 which passes through the gland nut and base 14 and is equipped with a collar 29 which is seated on a shoulder 30 formed in the base 14. Below the collar, the shaft is provided with a pinion 31 which meshes with the rack 21. Below the pinion, the projecting end 32 of the shaft is journaled in a bearing 33 formed in the bottom of the casing, which bearing coacts with the collar 29 in maintaining the shaft properly centered and preventing play of the shaft so that wear of the pinion and rack is positively prevented.

The follower 16, it will be observed, may be adjusted as usual by screwing down the gland nut to compress the packing washer 17 against the collar 29 and prevent leakage.

The rack and pinion device just described permits of the valve being very easily opened and closed. At the same time, by virtue of the valve stem 20 being accurately supported and guided on opposite sides of the rack 21 by means of the spider 24 and guide lug 25, vibration and wear between the contacting metal moving parts of the device will be practically eliminated so that the easy opening and closing characteristic of the valve will be preserved indefinitely.

In Fig. 5 there is shown a modified form of the valve, particularly adapted to flush tank valves which are fed from the top, as shown in Fig. 6.

In this modified form, the valve housing 34 is provided at the bottom with an outlet pipe 35 and at the top with an inlet flange pipe 36 which is beveled at the upper edge to provide a valve seat 37. In this modification, the valve 38, valve stem 39, spider 40, rack 41, reduced cylindrical guide extension 42, and collar 43 are identical in construction with the corresponding parts above described in detail and, hence, it is not thought necessary to duplicate the description. Likewise, the guide lug 44 having the concave surface 45 to receive the guide extension 42 is similar to the corresponding guide lug above described.

It will be observed, in this modified form of the invention, that the shaft 46 for operating the valve extends from the side of the valve casing and, as best shown in Fig. 6, is equipped within the valve casing with a pinion 47 which meshes with the rack 41. However, in this modification, adjustment of the packing to take up wear is effected by means of a nut 47 which is provided on the edge preferably with a series of three lugs 48. A serrated lug 49 is formed integral with the extension 50 of the valve casing 34. A set screw 51 is selectively engageable in threaded openings 52 formed in the lugs and may be advanced against the serrated edge of the lug 49 to hold the nut 47 stationary.

The purpose of having a plurality of the lugs 48 is to permit of fractional turns being given the nut, one of the lugs 48 being thus always available in overlying position above the serrated edge of the lug 49 to receive the set screw for locking the nut in place.

In the modified form of the invention shown in Figs. 5 and 6, as above stated, the flow through the inlet pipe 53 is upward, this pipe being provided with the usual hand-operated valve, designated in general by the numeral 54, which is operatively coupled by means of a housing 55 to the inlet pipe 36 of the valve housing 35. By backing off the usual nut 56 which secures the housing 55 to the intake pipe 36 and then disengaging the usual coupling nut 57 from the valve housing 54, the valve housing 55 may be removed, whereupon the valve 38 is, as above described, exposed for inspection and repairs.

As usual in the flush tank type of valve, the housing 35 is equipped with an after fill pipe 58.

In the modified form of the invention shown in Fig. 8, my improved valve and operating means therefor is shown applied to a flush tank type of valve in which the feed, contrary to that shown in Fig. 5, is from the bottom instead of from the top, and enters the valve housing 59 through a feed pipe 60, the valve 61 closing upwardly in the direction of flow. In this modification of the invention, the guide lug 62 is mounted in a shell 63 into which the reduced guide extension 64 projects. The outlet pipe 65 is connected to the side of the housing 59 in this modification. The valve stem 66, rack 67, spider 68, pinion 69, valve shaft 70, gland nut 71, lugs 72, serrated lug 73 and set screw 74 are all identical with the parts described in the modified forms of the invention shown in Figs. 5 and 6, and it is not necessary, therefore, to duplicate the description of these parts.

In all forms of the invention, whether applied to the spigot type or to the various flush tank types of valves, the valve embodying my improvements closes in the direction of flow, is exposed beyond the valve casing for easy inspection and repairs, and is operated by a rack and pinion device to facilitate easy opening and closing. In each species of invention, the valve stem is provided on opposite sides of the rack with a guide spider and a cylindrical guide extension, which latter is removably fitted in a guide lug that coacts with the spider in actively directing the sliding movements of the valve so that wear is reduced to an unavoidable minimum.

From the above description, it is thought that the construction and operation of my invention will be fully understood without further explanation.

Having thus described the invention, I claim:

1. A valve comprising a casing, a valve stem slidably mounted therein, inlet and outlet pipes extending from the casing, a valve on said stem seating in a beveled seat formed on the inlet pipe and exposed beyond the inlet pipe, a rack on said stem, guides on opposite sides of the rack and disposed in the inlet and outlet pipes for directing sliding movement of the stem, a rotatable shaft journaled in the casing and passing across said rack, and a pinion on said shaft engaging said rack.

2. A valve comprising a casing, a valve stem therein having one end uniformly reduced to provide a cylindrical guide, said guide terminating in a stop collar, a notched guide lug carried by the casing having a concave surface removably receiving said guide, said collar engaging said guide lug and limiting movement of the valve stem in one direction, a valve on said stem, a valve seat for the valve in the casing remote from said guide lug, a rack formed on said stem, an additional guide on the stem on the opposite side of the rack from said guide lug, a shaft rotatably mounted in the casing, and a pinion on the shaft meshing with said rack.

3. A valve comprising a casing, a valve stem therein, said stem terminating in a reduced cylindrical extremity forming a guide, a notched guide lug in the casing removably receiving said guide, a spider on said stem remote from the guide lug forming a second guide for the stem, a rack on the stem between said guides, an actuating shaft, a pinion on the shaft meshing with the rack, and a valve on said stem closing in the direction of flow through the casing.

4. A valve comprising a casing, a valve stem therein, a rack and pinion device operatively connected to the stem for moving the stem, a spider on the stem engaging the casing for directing sliding movement of the valve, a notched guide lug on the casing removably receiving the end of the stem and forming a guide for directing sliding movement of the stem, and a valve on said stem closing in the direction of flow through the casing.

5. A valve comprising a casing, a valve stem therein, a rack and pinion device operatively connected to the stem for moving the stem, a tapered valve seat formed in the casing, a tapered valve seated in said seat and exposed beyond the casing for easy inspection and repairs, guides coacting with the casing and stem for directing sliding movement of the stem, said guides being disposed on opposite sides of said device, and a stop on the end of said stem engageable with one of said guides for limiting opening movement of the valve.

In testimony whereof I affix my signature.

FREDERICK M. MASKER. [L. S.]